Figure 1:
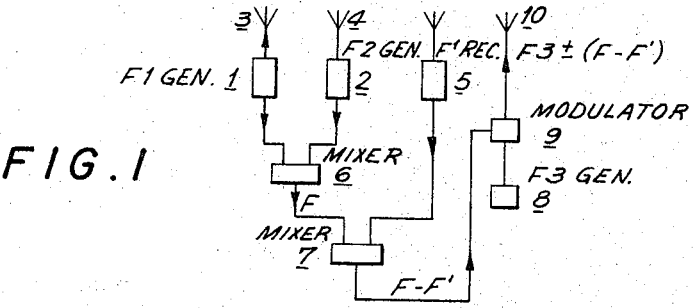

United States Patent Office 3,339,196
Patented Aug. 29, 1967

3,339,196
RADIO LOCATING SYSTEMS
Pierre Laurent, Fontenay-aux-Roses, France, assignor to Compagnie Generale de Geophysique, Paris, France, a corporation of France
Filed Jan. 13, 1965, Ser. No. 425,262
Claims priority, application France, Jan. 31, 1964, 962,202
3 Claims. (Cl. 343—12)

The present invention has for an object the provision of improved radio-locating systems operating with measurements of phase differences between two electronic signals of low frequency.

Several of such systems require the use at the same point of a transmitting station operating on a frequency F and also of a receiving station the part played by which consists in receiving from a remote point, a frequency F' very near F or even exactly equal to F.

It is obviously impossible to provide for the simultaneous operation at a same point of a transmitting station and of a station receiving the same frequency as that transmitted. It is furthermore extremely difficult to locate at the same point a transmitting station radiating a frequency F and a receiving station adapted to receive a frequency approximating F sent out by a remote station.

The known systems cut out these drawbacks by resorting to the transmission and reception of different harmonics of a same fundamental frequency or else they resort to stations which do not transmit in a continuous manner, but only during predetermined fractions of a cycle, which allows the receiving station to receive correctly during the intervals of time during which the transmitting station adjacent thereto does not radiate any waves.

The present invention has for its object a further solution of said problem and it consists chiefly in replacing the generator which is to supply the frequency F, of a value equal to or approximating the frequency F' to be received by the stationary station which is located next to the transmitting station, by two generators supplying respectively a frequency F1 and a frequency F2, said frequencies F1 and F2 being selected so as to be very different from F while their sum is equal to F.

Furthermore, these two frequencies F1 and F2 are selected in a manner such that their harmonics may be as different as possible from the frequency F' received by the receiving station.

The receiver which is to receive the frequency F is replaced by a receiver including two channels adapted to receive respectively the frequency F1 and the frequency F2, the output voltages of said receivers feeding a mixer supplying the frequency $F=F1+F2$. A simple calculation shows immediately that the phase of the voltage at said frequency F supplied by the mixer, is identical as concerns the duration of travel, with that shown by a wave at a frequency F radiated by the above-mentioned transmitter.

According to a modification, it is obviously possible to resort to two frequencies F1 and F2 in a manner such that their difference is equal to F. Of course, in this case the difference between said frequencies is collected at the output of the mixer.

Hereinafter will be disclosed by way of example an illustration, which should not be construed in a non-limiting manner of the invention as applied to the distance measuring system described in the French Patent 1,203,217 in the name of Compagnie Générale de Géophysique.

The prior distance-measuring system operates between two points A and B with the location at A of a transmitter radiating a frequency F and at B of a transmitter radiating a frequency F' very near F. A receiver located at the station A receives the frequencies F and F' and mixes them, which produces a beat wave, which serves for modulating a first auxiliary transmitter located also at A and radiating a wave at a frequency F3.

Furthermore, at the point B is located a receiver adapted to receive the waves at the frequency F produced at A and the waves at the frequency F' produced at B, the waves obtained at said receiver modulating in their turn a second auxiliary transmitter located at B and radiating waves at a frequency F4.

The frequencies F3 and F4 are clearly different from F and F'.

The actual frequencies F3 and F4 do not serve for the measurement of distances and they serve merely as carriers for the two low frequencies F and F'.

At a control station are located two receivers adapted to receive respectively the waves from the auxiliary transmitters located at A and at B. Said receivers supply through detection two low frequency currents of which the frequency is the same since it is equal to the difference $F-F'$. It is readily apparent that the difference in phase between said currents forms a measure of the distance separating the stations A and B, whatever may be the location of the two last-mentioned receivers considered.

In practice, said measurement or control station is furthermore generally located at A or at B.

It is apparent that the proper operation of the system requires the use of receivers at A and B for receiving waves transmitted at a frequency very near that of the waves radiated by the adjacent transmitter, which obviously leads to serious difficulties.

According to the present invention, the transmitter at one of the stations A or B, for instance the station A, is replaced by two transmitters supplying and radiating frequencies F1 and F2 the sum or difference of which is equal to F, which allows cutting out the above-mentioned drawbacks.

Figure 2:
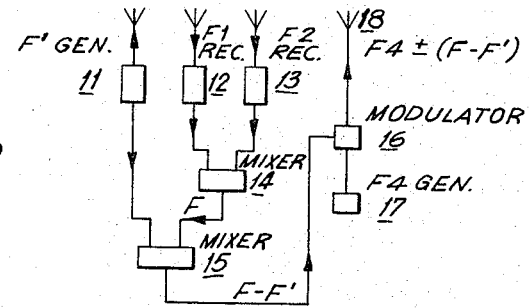
Figure 3:
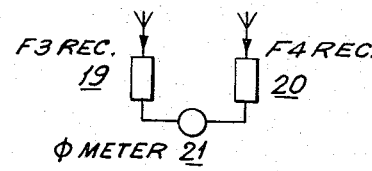

FIGURES 1, 2 and 3 of the accompanying drawings illustrate diagrammatically an embodiment of the invention as applied to a particular case.

In said figures, 1 designates the generator operating at a frequency F1 and 2 the generator operating at a frequency F2, the two generators feeding two separate aerials 3 and 4 or else a same aerial. At 5, is shown a receiver adapted to receive the frequency F'. Such a reception shows no difficulty since the frequency F' is very different from the frequencies F1 and F2.

A mixer 6 receives the waves at the frequencies F1 and F2 supplied by the generators 1 and 2 and it supplies at its output end the sum of or the difference in frequency between said waves and this sum or difference at a frequency F is applied to one input of a second mixer 7 which receives also at its other input the frequency F' supplied by the receiver 5.

At the output of the mixer 7 the frequency $F-F'$ is collected, which frequency serves for modulating in the modulator 9, the waves at a frequency F3 supplied by the generator 8 which last-mentioned waves are radiated by the aerial 10.

This part of the arrangement is located at the station A. At the station B are located a transmitter 11 radiating the frequency F' and two receivers 12 and 13 receiving respectively the frequencies F1 and F2, and the outputs of said receivers feed a mixer 14 which supplies consequently at its output end, the sum of or the difference between the frequencies F1 and F2, that is the frequency F.

A mixer 15 receives at its input the frequency F' supplied by the transmitter 11 and the frequency F supplied by the mixer 14 while the output of said mixer 15 supplies the difference $F-F'$ which serves for modulating in the modulator 16 the waves at a frequency F4 generated by the generator 17, said waves F4 being radiated by the aerial 18.

The measuring or control station is constituted exactly in the same manner as in the case of the above mentioned prior patent and it includes a receiver 19 receiving the frequency F3 and a receiver 20 receiving the frequency F4, each of said receivers being provided with a detector, so that at their output ends, two currents of the same low frequency $F-F'$ are obtained. Said currents are applied to a phase-meter 21 and the indication given out by the phase-meter forms a measure of the distance separating the points A and B.

As already mentioned, the measuring or control station C may be located at a point different from the points A and B.

In the case where the measuring station is located at the point A, it is obviously possible to dispense with the parts 8, 9 and 10, and the receiver 20 is positioned at the station A so as to feed one of the inputs of the phase meter 21, the other input of which is connected with the output of the mixer 7.

If it is desired to measure, in addition to the distance separating A from B, the distance separating A from another point D, it is sufficient to provide at D parts similar to those provided at the station B, the pure wave transmitted at such a point D being given the same frequency F' as that produced at B while the waves modulated at D would show a frequency F5 differing from the other frequencies F1 to F4.

Obviously the arrangement described is only a particular application of a limited scope of the invention and various embodiments and applications of the latter may be imagined within the scope of the accompanying claims.

What I claim is:

1. A radio-locating system comprising at a first station two transmitters adapted to radiate two different frequencies, the combination of which produces a predetermined frequency F, a receiver adapted to receive a frequency F' slightly different from F, a first mixer combining said two first-mentioned frequencies to produce the frequency F, a second mixer forming first beats between F and F', and means for generating and modulating a further frequency F3 with said beats, and at at least one other station, two receivers adapted to receive the two first-mentioned different frequencies, a transmitter adapted to transmit the frequency F', a first mixer combining the two first-mentioned frequencies to produce the frequency F, a further mixer forming second beats between the frequency F received from the first mixer at said other station and the frequency F received from the latter said transmitter, means producing an auxiliary frequency which is characteristic of said other station and means modulating said auxiliary frequency with said second beats, means for detecting the beats modulating the frequencies at the different stations and a phase-meter comparing the detected beats to measure the distance between the corresponding stations.

2. A radio-locating system comprising at a first station two transmitters adapted to radiate two different frequencies, the combination of which produces a predetermined frequency F, a receiver adapted to receive a frequency F' slightly different from F, a first mixer combining said two first-mentioned frequencies to produce the frequency F, a second mixer forming first beats between F and F' and means for generating and modulating a further frequency F3 with said first beats and at at least one other station, two receivers adapted to receive the two first-mentioned different frequencies, a transmitter adapted to transmit the frequency F', a first mixer combining the two first-mentioned frequencies to produce the frequency F, a further mixer forming second beats between the frequency F received from the first mixer at said other station and the frequency F received from the latter said transmitter, means producing an auxiliary frequency which is characteristic of said other station and means modulating said auxiliary frequency with said second beats, a control station including receivers adapted to receive selectively the further frequency and the auxiliary frequencies and to detect the beats in said frequencies, and at least one phase-meter adapted to compare the phases of the detected beats from the further frequency and auxiliary frequency as a measure of the distances between the corresponding stations.

3. A radio-locating system comprising at a first station two transmitters adapted to radiate two different frequencies, the combination of which produces a predetermined frequency F, a receiver adapted to receive a frequency F' slightly different from F, a first mixer combining said two first-mentioned frequencies to produce the frequency F, a second mixer forming first beats between F and F' and at at least one other station, two receivers adapted to receive the two first-mentioned different frequencies, a transmitter adapted to transmit the frequency F', a first mixer combining the two first-mentioned frequencies to produce the frequency F, a further mixer forming second beats between the frequency F received from the first mixer at said other station and the frequency F received from the latter said transmitter, means producing an auxiliary frequency which is characteristic of said other station, and means modulating said auxiliary frequency with said second beats, a receiver at the first station adapted to receive the further frequency thus modulated and to detect the beats in said further frequency, a phase-meter comparing the outputs of last-mentioned receiver and of the second mixer at the first station to compare the phases of the detected beats from the further frequency and an auxilary frequency as a measure of the distances between the corresponding stations.

References Cited

UNITED STATES PATENTS

| | | | |
|---|---|---|---|
| 2,742,638 | 4/1956 | Haywood et al. | 343—12 |
| 3,155,972 | 11/1964 | Boyer | 343—12 |
| 3,213,449 | 10/1965 | Kobayashi et al. | 343—12 |

RODNEY D. BENNETT, *Primary Examiner.*

J. P. MORRIS, *Assistant Examiner.*